US012693975B2

(12) United States Patent
Abali et al.

(10) Patent No.: US 12,693,975 B2
(45) Date of Patent: Jul. 28, 2026

(54) USING A PREDETERMINED BIT TO REPRESENT A PREDETERMINED PATTERN IN A CACHE LINE

(71) Applicant: International Business Machines Corporation, Armonk, NY (US)

(72) Inventors: Bulent Abali, Tenafly, NJ (US); Alper Buyuktosunoglu, White Plains, NY (US); Ashutosh Mishra, Lagrangeville, NY (US); David Trilla Rodriguez, New York, NY (US); Craig R. Walters, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 102 days.

(21) Appl. No.: 18/083,271

(22) Filed: Dec. 16, 2022

(65) Prior Publication Data

US 2024/0202117 A1 Jun. 20, 2024

(51) Int. Cl.
G06F 12/0802 (2016.01)

(52) U.S. Cl.
CPC .. G06F 12/0802 (2013.01); G06F 2212/1024 (2013.01)

(58) Field of Classification Search
None
See application file for complete search history.

(56) References Cited

U.S. PATENT DOCUMENTS

| | | | |
|---|---|---|---|
| 10,282,296 B2 | 5/2019 | Brandt et al. | |
| 10,394,724 B2 * | 8/2019 | Suh | G06F 13/1673 |
| 10,489,300 B1 * | 11/2019 | Nampoothiri | H03M 7/3091 |
| 10,503,661 B2 | 12/2019 | Heddes et al. | |
| 10,853,257 B1 * | 12/2020 | Yu | G06F 3/0649 |
| 11,269,516 B1 * | 3/2022 | Armangau | G06F 3/065 |
| 11,294,809 B2 | 4/2022 | Brandt et al. | |

(Continued)

OTHER PUBLICATIONS

Villa et al., "Dynamic Zero Compression for Cache Energy Reduction," 33rd International Symposium on Microarchitecture, Dec. 2000, pp. 1-7.

(Continued)

*Primary Examiner* — Reginald G Bragdon
*Assistant Examiner* — Ralph A Verderamo, III
(74) *Attorney, Agent, or Firm* — L. Jeffrey Kelly

(57) ABSTRACT

A computer-implemented method, according to one embodiment, includes determining that a first predetermined pattern is to be written to a first cache line of a cache. In response to the determination, a first bit is set in a first directory instead of writing the first predetermined pattern in the first cache line. The first bit is associated with the first cache line in the first directory. A computer program product, according to another embodiment, includes a computer readable storage medium having program instructions embodied therewith. The program instructions are readable and/or executable by a computer to cause the computer to perform the foregoing method. A system, according to another embodiment, includes a processor, and logic integrated with the processor, executable by the processor, or integrated with and executable by the processor. The logic is configured to perform the foregoing method.

20 Claims, 6 Drawing Sheets

(56) References Cited

U.S. PATENT DOCUMENTS

| | | | | |
|---|---|---|---|---|
| 2011/0202709 A1* | 8/2011 | Rychlik | ................ | G06F 3/0641 |
| | | | | 711/E12.001 |
| 2016/0098353 A1* | 4/2016 | Shiu | ..................... | G06F 3/0604 |
| | | | | 711/133 |
| 2018/0004659 A1* | 1/2018 | Greenspan | .......... | G06F 12/0802 |
| 2020/0226068 A1* | 7/2020 | Gellerich | ........... | G06F 12/0804 |
| 2021/0056036 A1* | 2/2021 | Breslow | ............. | H03M 7/3088 |
| 2021/0157485 A1* | 5/2021 | Tomei | ................... | G06F 3/0608 |
| 2022/0100655 A1* | 3/2022 | Seningen | ............ | G06F 12/0802 |
| 2023/0099256 A1* | 3/2023 | Moyer | ................ | G06F 12/0831 |
| | | | | 711/141 |
| 2023/0236972 A1* | 7/2023 | Reed | ................... | G06F 12/0813 |
| | | | | 711/118 |

OTHER PUBLICATIONS

Anonymous, "Efficient memory clearing for cache-sensitive data," Prior Art Database, Technical Disclosure No. IPCOM000233942D, Jan. 3, 2014, 3 pages.

Anonymous, "Efficient clearing of memory regions (dcbzi)," Prior Art Database, Technical Disclosure No. IPCOM000230163D, Aug. 23, 2013, 2 pages.

Anonymous, "System and method for a dynamic cache associativity in a computer cache subsystem," Prior Art Database, Technical Disclosure No. IPCOM000223147D, Nov. 5, 2012, 2 pages.

Anonymous, "Method for Prefetching Cache Lines Based on the Presence of Uninitialized Lines," Prior Art Database, Technical Disclosure No. IPCOM000027339D, Apr. 7, 2004, 3 pages.

* cited by examiner

100

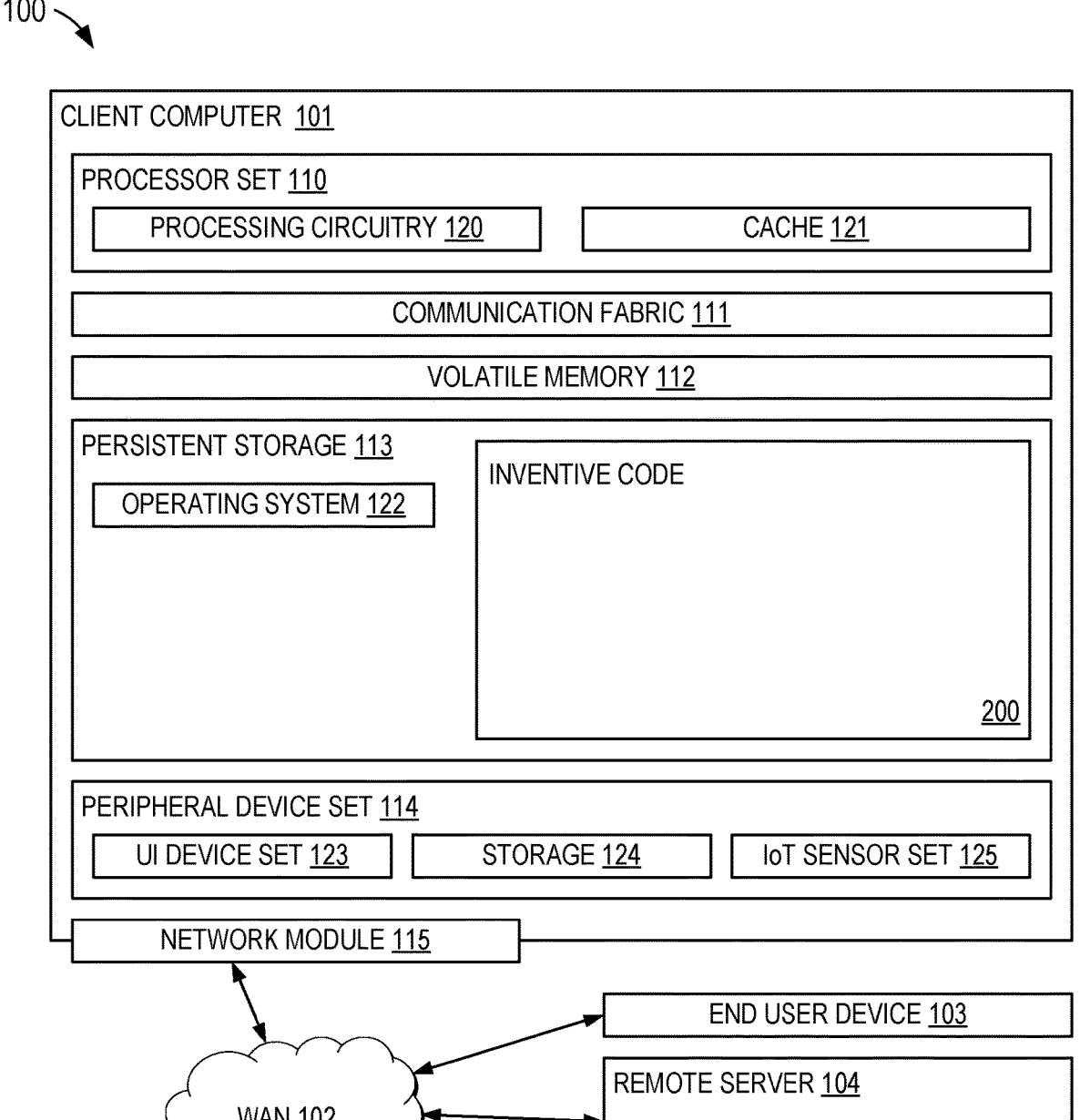

CLIENT COMPUTER 101

PROCESSOR SET 110

PROCESSING CIRCUITRY 120      CACHE 121

COMMUNICATION FABRIC 111

VOLATILE MEMORY 112

PERSISTENT STORAGE 113

OPERATING SYSTEM 122

INVENTIVE CODE

200

PERIPHERAL DEVICE SET 114

UI DEVICE SET 123      STORAGE 124      IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141      HOST PHYSICAL MACHINE SET 142

VIRTUAL MACHINE SET 143      CONTAINER SET 144

FIG. 1

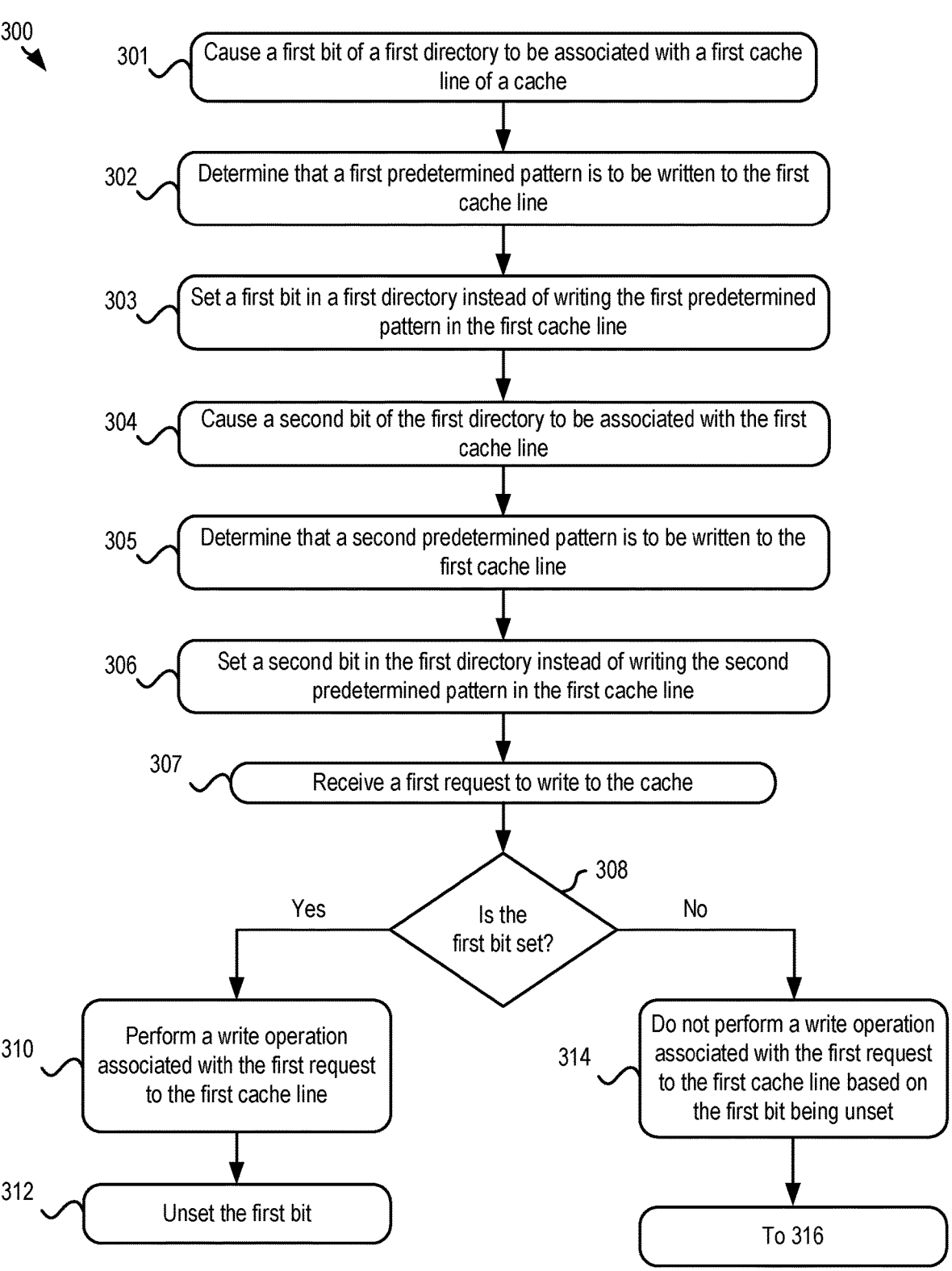

300

301 — Cause a first bit of a first directory to be associated with a first cache line of a cache 302 — Determine that a first predetermined pattern is to be written to the first cache line 303 — Set a first bit in a first directory instead of writing the first predetermined pattern in the first cache line 304 — Cause a second bit of the first directory to be associated with the first cache line 305 — Determine that a second predetermined pattern is to be written to the first cache line 306 — Set a second bit in the first directory instead of writing the second predetermined pattern in the first cache line 307 — Receive a first request to write to the cache 308 — Is the first bit set?

Yes

No

310 — Perform a write operation associated with the first request to the first cache line 314 — Do not perform a write operation associated with the first request to the first cache line based on the first bit being unset 312 — Unset the first bit To 316

FIG. 3

300
From 314
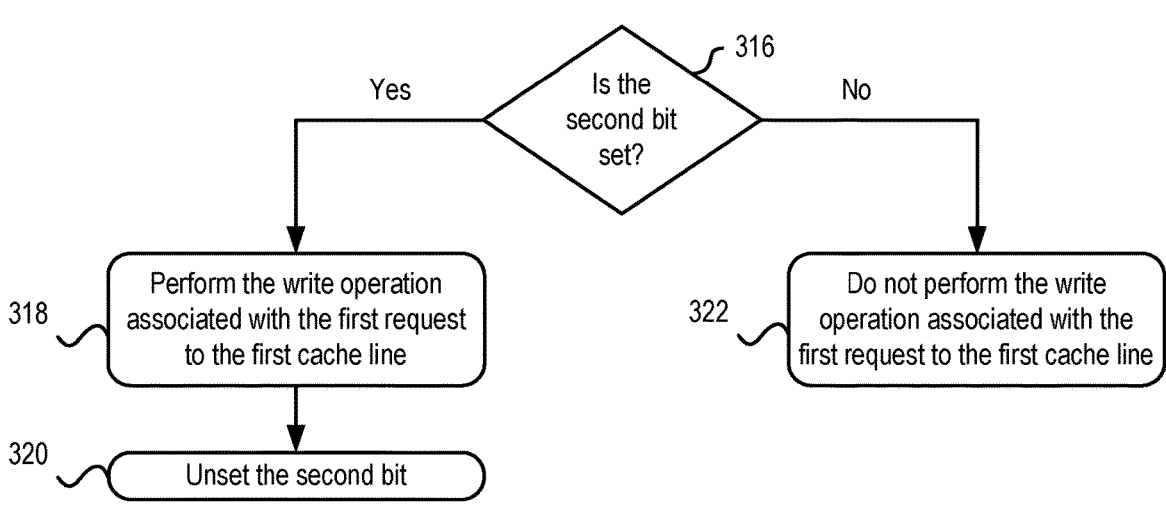
Yes          Is the second bit set?          No          316
318  Perform the write operation associated with the first request to the first cache line
322  Do not perform the write operation associated with the first request to the first cache line
320  Unset the second bit
FIG. 3
(continued)

USING A PREDETERMINED BIT TO REPRESENT A PREDETERMINED PATTERN IN A CACHE LINE

BACKGROUND

The present invention relates to cache memory, and more specifically, this invention relates to using a predetermined bit to represent a predetermined pattern in a cache line, such as a sequence of zeros.

Some conventional computer memory and processor caches contain an abundance of "zero" data bytes and data blocks in practice. For example, a value of zero may be written to at least one cache line of bytes in order to indicate that these data bytes are available for storing data. In some use cases, the value of zero may be written to the at least one cache line as part of a reclamation process, e.g., freeing up the data bytes subsequent to the data bytes being used for storing data. In some other use cases, the value of zero may be written to the at least one cache line as part of a default process, e.g., initializing the data bytes with zeros where the data bytes have not previously been used for storing data.

SUMMARY

A computer-implemented method, according to one embodiment, includes determining that a first predetermined pattern is to be written to a first cache line of a cache. In response to the determination, a first bit is set in a first directory instead of writing the first predetermined pattern in the first cache line. The first bit is associated with the first cache line in the first directory.

A computer program product, according to another embodiment, includes a computer readable storage medium having program instructions embodied therewith. The program instructions are readable and/or executable by a computer to cause the computer to perform the foregoing method.

A system, according to another embodiment, includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one embodiment of the present invention.

FIG. 3 is a flowchart of a method, in accordance with one embodiment of the present invention.

DETAILED DESCRIPTION

Figure 2:
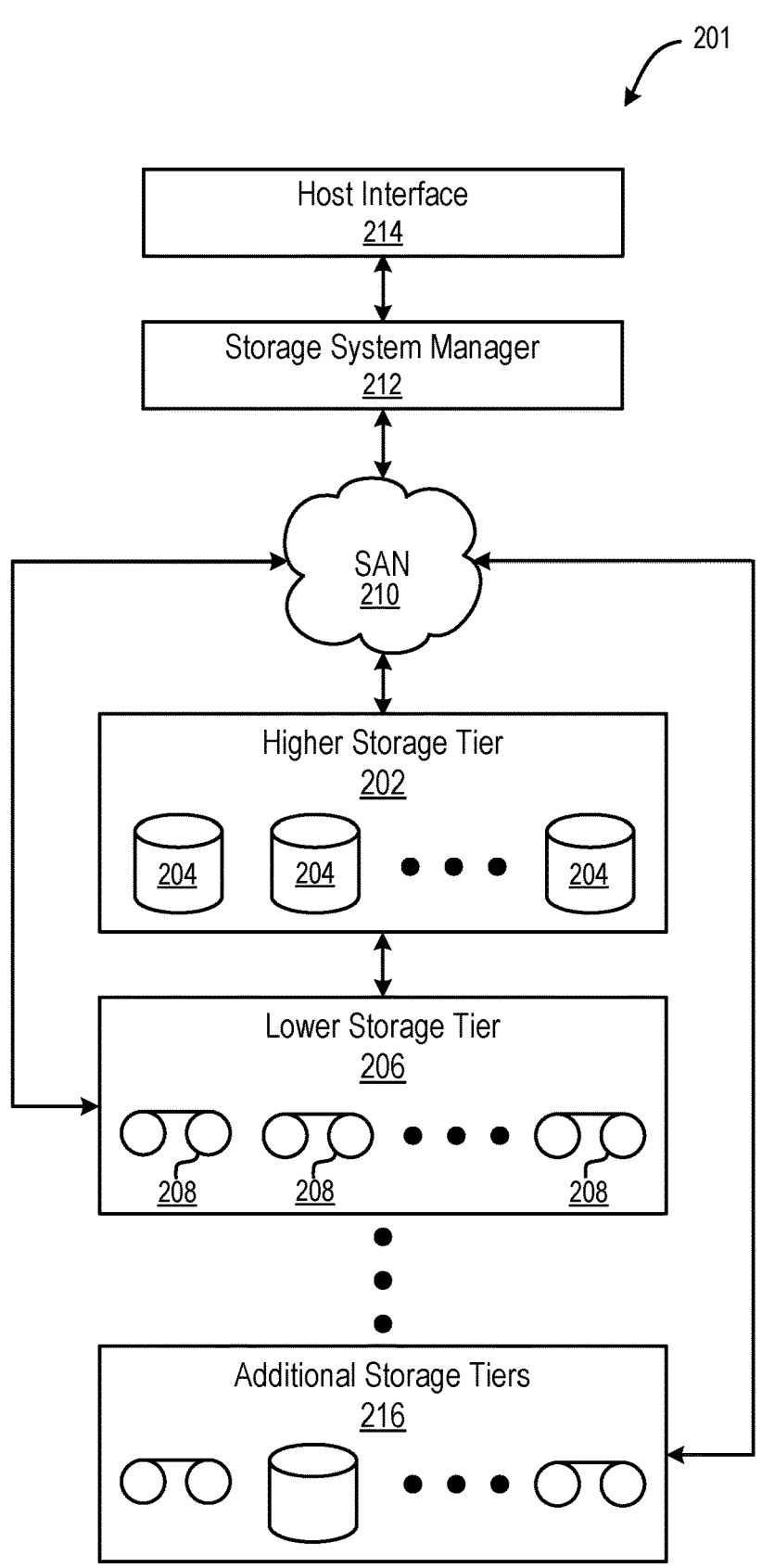
FIG. 2 is a diagram of a tiered data storage system, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using a predetermined bit to represent a predetermined pattern in a cache line, such as a sequence of zeros.

In one general embodiment, a computer-implemented method includes determining that a first predetermined pattern is to be written to a first cache line of a cache. In response to the determination, a first bit is set in a first directory instead of writing the first predetermined pattern in the first cache line. The first bit is associated with the first cache line in the first directory.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as inventive code of block 200 for using a predetermined bit to represent a predetermined pattern in a cache line, such as a sequence of zeros. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IOT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system, according to various embodiments, may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Now referring to FIG. 2, a storage system 201 is shown according to one embodiment. Note that some of the elements shown in FIG. 2 may be implemented as hardware and/or software, according to various embodiments. The storage system 201 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 201. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 201 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 201 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 201) may include logic configured to receive a request to open a data set, logic configured to determine if the requested data set is stored to a lower storage tier 206 of a tiered data storage system 201 in multiple associated portions, logic configured to move each associated portion of the requested data set to a higher storage tier 202 of the tiered data storage system 201, and logic configured to assemble the requested data set on the higher storage tier 202 of the tiered data storage system 201 from the associated portions.

Of course, this logic may be implemented as a method on any device and/or system or as a computer program product, according to various embodiments.

As mentioned elsewhere herein, some conventional computer memory and processor caches contain an abundance of "zero" data bytes and data blocks in practice. For example, a value of zero may be written to at least one cache line of bytes when these data bytes are available for storing data. In some use cases, the value of zero may be written to the at least one cache line as part of a reclamation process, e.g., freeing up the data bytes subsequent to the data bytes being used for storing data. In some other use cases, the value of zero may be written to the at least one cache line as part of a default process, e.g., initializing the data bytes with zeros where the data bytes have not previously been used for storing data. In order to write data, a processor transfers from memory to the cache and reads out a plurality of these zero values of the cache line. However, this reading and writing takes time and consumes processing resources which ultimately slows performance of a computer device that utilizes such cache.

In sharp contrast to the deficiencies described above, techniques of various embodiments and approaches described herein include encoding zero-filled cache lines with a special predetermined bit, e.g., which may, in some approaches herein, be referred to as a "zero-bit," or "z-bit." More specifically, in response to a determination that a first predetermined pattern is to be written to a first cache line, such a predetermined bit may be set in a first directory instead of writing the first predetermined pattern in the first cache line. Here, the first predetermined bit is associated with the first cache line in the first directory. This way, in order to use the bytes of a cache line, only the predetermined bit is referenced, rather than having to otherwise perform write operations of zeros to the cache line and perform a read operation on the bytes of the cache line to determine that bytes of the cache line are available for caching data to. Numerous additional advantages in terms of cache capacity and performance, and power/energy savings are enabled as a result of the techniques of various embodiments and approaches described herein enabling cache organizations that can contain predetermined special data patterns. In one example, as a result of replacing a zero filled cache line with a single bit, a 256-byte cache line may be encoded with a single bit. This is a factor of 2048 reduction in data size. Freeing up zero-lines in a cache hierarchy furthermore provides additional cache space for non-zero lines. This therefore increases the effective cache capacity which in turn improves processor performance. For example, an about six percent increase in directory area can encode thirty-two megabytes (MB) of zero lines in a thirty-two MB cache in one implementation. In other words, with an about six percent area increase, the equivalent of sixty-four MB cache capacity is obtained. Because a cache directory size is typically one-fifth to one-tenth of an entire cache area, with a trivial increase in area, the effective cache capacity is doubled. In another example, one address tag may cover one page of zero lines. A four kilobyte (KB) page mode may have sixteen lines of 256-byte each. Thirty two MB of non-zero lines may already exist and thirty two MB of zero lines may be enabled based on the techniques described herein. The techniques of embodiments and approaches described herein furthermore improve bus/ring utilization and inter-cache traffic on a processor chip by reducing an amount of data that is transferred, e.g., based on the predetermined bit being able to be referenced. Furthermore, in response to the predetermined bit being integrated into a main cache directory, e.g., a cache directory that includes tags, as opposed to a different separate directory of predetermined z-bits, few bits per tag overhead is present, and the directory increase is much less than six percent. In other words, performance benefits enabled as a result of the addition of predetermined bits to a cache directory far outweigh the small increases to directory consumption.

Now referring to FIG. 3, a flowchart of a method 300 is shown according to one embodiment. The method 300 may be performed in accordance with the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 301 includes causing a first bit, e.g., a first z-bit, of a first directory to be associated with a first cache line of a cache. In some approaches, the first bit of the first directory may be caused to be associated with the first cache line of the cache using an encoding operation that would become appreciated by one of ordinary skill in the art upon reading the descriptions herein.

Method 300 preferably includes setting the first predetermined bit, e.g., set to a value of one, set to a value of zero, set blank, etc., instead of writing a first predetermined pattern in bytes of the first cache line, e.g., see operation 303. For example, in response a determination that the first predetermined pattern is to be written to the first cache line, the first bit may instead be set, e.g., see operation 302. In some approaches, in response to a reclamation write operation being instructed to be performed that includes writing zeros to the first cache line, the first bit is preferably set instead. Accordingly, in some approaches, the first bit thereafter indicates that the first cache line logically includes the first predetermined pattern and may be referenced thereafter to make such a determination and/or output to indicate such a determination.

For context, a "line of cache," in some preferred approaches, includes 256 bytes. However, it should be noted that although various approaches described herein describe operations performed with respect to a line of cache, other approaches may perform similar operations with respect to any predetermined unit of storage of the cache. For example, in another approach, the first bit of the first directory may additionally and/or alternatively be associated with, e.g., a predetermined number of bytes of the cache, and one or more of the bytes may be proximate to one another, e.g., a chunk, while one or more other bytes may be in different non-proximate locations on the cache. In some other approaches, the first bit of the first directory may additionally and/or alternatively be associated with, e.g., a predetermined chunk of cache data space, a plurality of chunks of cache space, a predetermined number of bits of a byte, etc.

Method 300 optionally includes storing an address of the first cache line with the first bit in the first directory. This way, the association between the first bit and the cache line is defined in the first cache.

The first directory may, in some approaches, be a directory of the cache. In such an approach, the first directory of the cache may include addresses, e.g., tags, that are each associated with a different cache line of the cache. The first bit may, in some approaches, be stored with an address of the first cache line, e.g., stored with a tag that is associated with the first cache line of the cache. In this approach, it may be noted that the first bit is stored integrally in the directory of the cache. Storing the first bit in the first directory may, in some approaches, increase the storage size of the first directory, e.g., on a factor of the number of z-bits that are stored to the first directory. As previously mentioned, this relative increase in storage size may be acceptable based on the performance benefits that storing such a bit enables, e.g., eliminating the need to read out the first cache line to determine whether the bytes of the first cache line are available for writing to. In contrast, in some other approaches, the first directory is different than a second directory that is a directory of the cache that includes addresses, e.g., tags, each associated with a different cache line of the cache. Accordingly, in one or more of such approaches, the first directory may be a directory that is created for storing one or more bits each associated with cache lines. This separate directory may be stored at any one or more storage locations, e.g., on a predetermined memory module, in one or more modules of a multi-tier storage environment, to a predetermined location on the cache, etc.

Although, in some preferred approaches described herein, a single predetermined bit, e.g., the first bit, is caused to be associated with a cache line, e.g., the first cache line, to thereby indicate whether the cache line is available for caching data to, in some approaches, more than one bit may be caused to be associated with the first cache line. For example, where two bits are associated with the first cache line, up to four different states of the first cache line, e.g., such as four different predetermined patterns stored in bits of bytes of the first cache line, may be indicated by the two bits, e.g., 00, 01, 10 and 11. For purposes of an example, the flowchart of FIG. 3 is described herein from the perspective of two of such bits, e.g., two z-bits, although in other approaches, a single bit may be preferred, or more than two bits may be preferred. Operation 304 includes causing, e.g., encoding, a second bit of the first directory to be associated with the first cache line in the first directory. It may be determined that a second predetermined pattern is to be written to the first cache line, e.g., see operation 305. In response to such a determination, the second bit may be set in the first directory instead of writing the second predetermined pattern in the first cache line, e.g., see operation 306.

The predetermined patterns that may be logically indicated to be present in the first cache line may include any type of pattern that may otherwise be reflected in the bytes of the first cache line and/or bits of the bytes of the first cache line. For context, it is useful to know what type of predetermined pattern is logically included in the bytes of the first cache line, because the predetermined pattern may indicate a relative number of bytes of the first cache line that are available for performing a cache write operation to. For example, in one preferred approach, a first predetermined pattern may include each of the bytes (or bits thereof) of the first cache line having only zeros, e.g., the bit being set thereby indicates that the values of each of the bytes in the first cache line are to be considered zero and therefore available for writing to. In another approach, a predetermined pattern may include a portion of the bytes of the first cache line having only zeros. Accordingly, an associated bit being set may indicate that some, but not all, of the bytes of the first cache line are to be considered zero and therefore available for writing to. In the meantime, it is important to note that, because a plurality of the bytes of the cache line do not need to store zeros to indicate that the bytes of the first cache line are available for caching data to, this portion of the cache line is freed up for caching data to. This increases a use size of the cache. Furthermore, this improves a relative performance of the cache and processing operations associated with use of the cache because bytes of the cache line do not need to be read out to determine whether the cache line is available for caching data to. In another approach, a predetermined pattern may include all the bytes of the first cache line having only blanks, e.g., blank characters of an ASCII table or some other predetermined pattern such as 0xFF. In yet another approach, a predetermined pattern may include a portion of the bytes of the first cache line having only blanks or some other predetermined pattern.

Assuming that both the first bit and the second bit are associated with the first cache line, in one preferred approach, the first bit may be configured to be set instead of writing the first predetermined pattern in the first cache line, where the first predetermined pattern includes each of the bytes of the first cache line having only zeros. Furthermore, in such a preferred approach, the second predetermined pattern preferably includes at least a predetermined number of the bytes of the first cache line having only zeros, but less than all the bytes of the first cache line having only zeros.

Operation 307 includes receiving a first request to write data to the cache. The first request may be a known type of request to write data to a cache. In order to determine whether the cache currently includes storage resources that can be used to store data associated with the first request and thereby satisfy the first request, in some approaches, in response to receiving the first request to write to the cache, it is determined whether the first bit is set, e.g., see decision 308. It should be noted that the first cache line, e.g., bytes of the first cache line, bits of bytes of the first cache line, etc., is preferably not read, subsequent to and/or in response to receiving the first request, to determine whether the first cache line is available for writing to. Reference of a bit rather than reading out a cache line to determine whether a cache line has storage resources to fulfill a request to write to the cache has heretofore not been considered in conventional techniques. Accordingly, the inventive discoveries disclosed herein with regards to using a predetermined bit to represent a predetermined pattern in a cache line proceed contrary to conventional wisdom.

In response to a determination that the first bit is set, e.g., as illustrated by the "Yes" logical path of decision 308, a write operation associated with the first request is performed to the first cache line, e.g., see operation 310. In some approaches, an address of bytes of the first cache line that are used for the write operation may be stored with the bit in the first directory. Accordingly, in some approaches, the first directory may optionally be referenced in order to perform the write operation. The first bit may be unset in response to the write operation associated with the first request being performed, e.g., see operation 312. In contrast, in response to a determination that the first bit is not set, e.g., as illustrated by the "No" logical path of decision 308, the write operation associated with the first request is not performed to the first cache line, e.g., see operation 314. It should be noted that in some approaches, the write operation associated with the first request is only temporarily not performed to the first cache line. For example, although the write operation associated with the first request may not be performed to the first cache based on a determination that the first bit is not set, an additional bit, e.g., the second bit, may be referenced to determine whether to perform the write operation associated with the first request. For example, in one use case, the first bit may be unset, and the second bit may be set. Accordingly, in response to a determination that the first bit is unset and/or in response to receiving the first request to write to the cache, the write operation associated with the first request may be at least temporarily suspended to allow for the second bit to be checked, e.g., see decision 316.

It should be noted that the first cache line, e.g., bytes of the first cache line, bits of bytes of the first cache line, etc., is preferably not read, subsequent to and/or in response to receiving the first request, to determine whether the first cache line is available for writing to. Instead, the second bit may be checked to make such a determination, e.g., where the second bit indicates that at least a portion of the first cache line includes a predetermined pattern. In response to a determination that the second bit is set, e.g., as illustrated by the "Yes" logical path of decision 316, the write operation associated with the first request may be performed to the first cache line, e.g., see operation 318. More specifically, in some approaches, the write operation associated with the first request may be performed to a portion of the first cache line, e.g., a portion of the bytes of the first cache line, a portion of the bits of a portion of the bytes of the first cache line, etc., that are associated with the second bit. The second bit may be unset in response to a determination that the write operation associated with the second request has been performed, e.g., see operation 320. In contrast, in response to a determination that the second bit is not set, e.g., as illustrated by the "No" logical path of decision 316, the write operation associated with the first request is not performed to the first cache line, e.g., see operation 322. More specifically, the write operation associated with the first request may not be performed to the bytes of the first cache line that are determined to not have the second predetermined pattern. In some approaches, other bits associated with other cache lines may be referenced in order to determine a cache line having availability for fulfilling the first request. In response to a determination that all of the cache lines are not available, e.g., determined by each of the predetermined bits being not set, a notification may be output, e.g., to a source of the request, which indicates that all the lines of the first cache are full. In some other approaches, a master bit may be set and referenced in response to a determination that each of the bits associated with the cache lines, e.g., z-bits, are set. This way, only one bit may be at least initially referenced to determine whether cache lines are available for caching data to, e.g., include logical zeros. If any of the z-bits are unset, the master bit may also be unset.

Although various approaches above are described with respect to a first cache line, other bits may additionally and/or alternatively be associated with one or more other cache lines of the cache using techniques similar to those described above with respect to the first cache line. For example, method 300 optionally includes causing a bit, e.g., hereafter referred to as "the third bit," of a first directory to be associated with a second cache line of the cache. The association may be stored in one or more directories described elsewhere herein. It may be determined that a predetermined pattern is to be written to the second cache line. In response to the determination that the predetermined pattern is to be written to the second cache line, a second bit is preferably set in the first directory instead of writing the second predetermined pattern in the second cache line. In response to receiving a request to write to the cache, it may be determined whether the second bit is set. It should be noted that the second cache line, e.g., bytes of the second cache line, bits of bytes of the second cache line, etc., is preferably not read, subsequent to and/or in response to receiving the request to write to the cache, to determine whether the second cache line is available for writing to. In response to a determination that the second bit is set, a write operation associated with the second request may be performed to the second cache line. Furthermore, in some approaches, the second bit may be unset in response to the write operation associated with the second request being performed. In response to a determination that the second bit is not set, the write operation associated with the second request is optionally not performed to the second cache line.

Techniques for reading the bits associated with the cache lines and writing based on the "zero line" directory reading will now be described, according to various approaches. It may be prefaced that because there is no cache data array to access, reads from a directory that includes the bits associated with cache lines are advantageously able to be performed relatively faster than a regular cache read. Various approaches herein may aim to "move" a "zero" line into an entry that has physical data space (in the cache proper). This means that when a processor reads a zero filled line, this may lead to an intention to write to the zero filled line, and therefore, a physical data space in the cache must be created to be able to write into. The following descriptions illustrate how to handle such an operation. For example, in response to a processor reading a cache line marked as zero, e.g., marked by an associated bit being set to a value of one, the cache controller may prepare for a write operation. The write value will most likely contain not all zeros because the processor, in all likelihood, would not write zeros over a line that is already a zero. Therefore, the cache controller makes a physical space available in preparation for this write. In one embodiment, a directory containing the bits associated with cache lines may be logically considered as the next level in the cache hierarchy. Therefore, a cache read of the bit set to the value of one may be treated as if it was a cache-miss. It should be noted that, as far as timing is concerned, the zero-line is delivered to the processor about instantaneously without the conventional miss delay. It should be distinguished that a miss in conventional cache use cases requires that the missed line be brought into the cache, and another line being evicted out of the cache. Accordingly, in some approaches described herein, in response to reading a line from the first directory, another line may be evicted from the conventional cache to make the physical line space available for the impending write.

Various techniques for performing the eviction mentioned above will now be described, according to several approaches. These techniques may be performed as optional operations of method 300. In some approaches in which multiple consecutive cache lines, e.g., zero-lines, are encoded with a single z-bit and a single page address tag in the cache, line eviction may differ than conventional cache eviction operations. This is because one address tag may cover multiple lines, and if one line is to be evicted, all lines that are associated with that tag must be evicted from the cache. Up to 16 lines (when encoding one 4 KB page of zeros with one tag) may need to be evicted. The evicted zero-lines are transmitted to the memory as one z-bit per line. It should be noted that in some approaches, this enables a factor of a 2048 reduction in data size. A memory controller may store the zero-line as a single zero-bit per line or a whole line depending on the implementation. This has an advantage of reducing bandwidth utilization relatively significantly.

Numerous benefits are enabled as a result of the techniques of embodiments and approaches described herein. Several of these benefits are described elsewhere above. One primary benefit to these novel techniques includes a relative reduction in processing performed by a computer and/or a processor that is configured to manage a cache. This is because cache lines do not need to be read out to determine whether the cache lines include predetermined pattern(s), e.g., zeros. Instead, a mere bit that is set and unset to indicate the logical contents of an associated cache line of bytes is checked. Techniques for performing a relatively fast memory clearing using a bit associated with a cache line is further described elsewhere herein, e.g., see FIG. 5.

Figure 4:
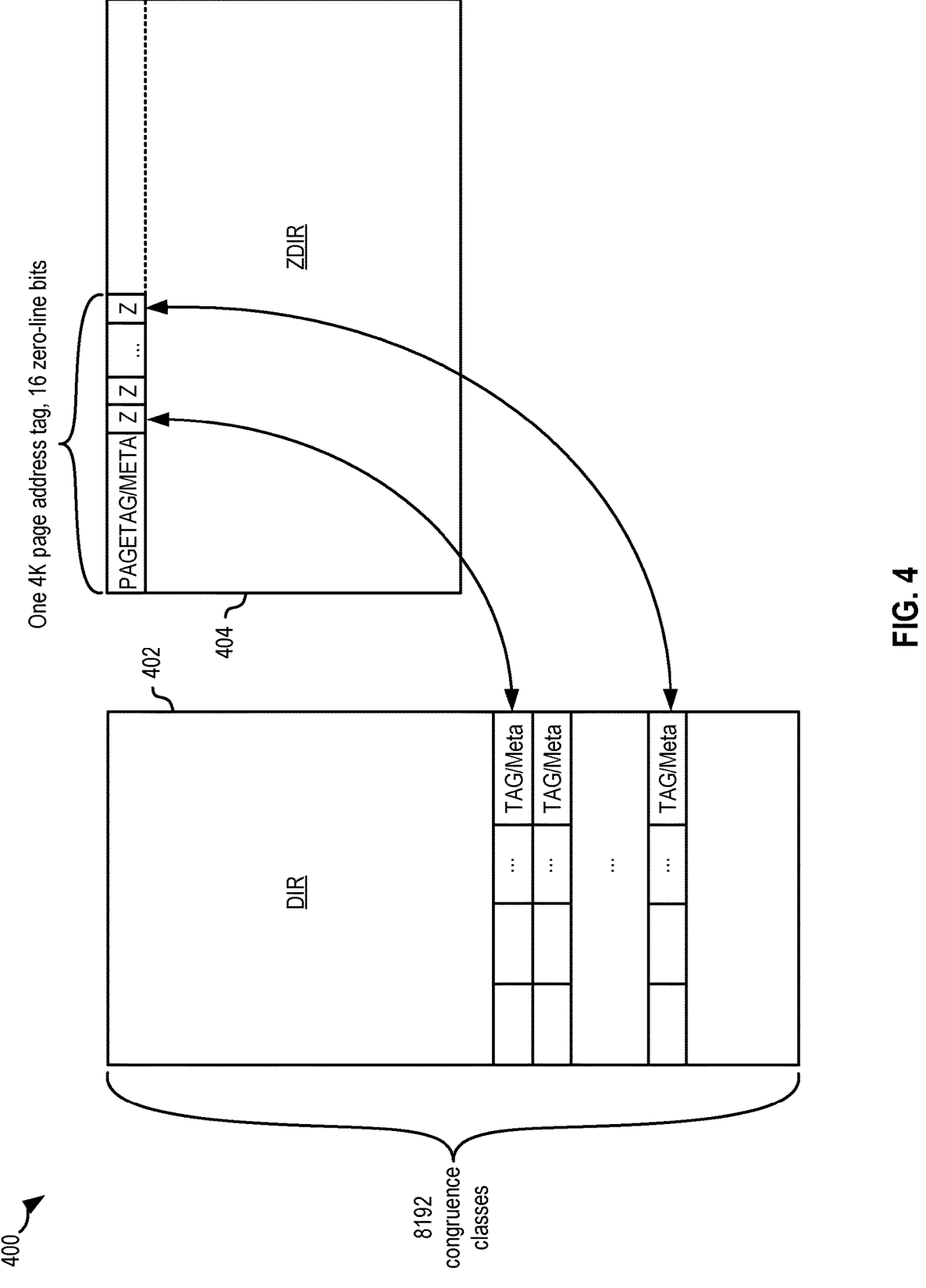
FIG. 4 is a representation of directories, in accordance with one embodiment of the present invention.

FIG. 4 depicts a representation 400 of directories that include bits associated with cache lines of a cache, in accordance with one embodiment. Note that a cache data array that the bits are associated with is not shown in FIG. 4 for purposes of brevity. As an option, the present representation 400 may be implemented in conjunction with features from any other embodiments listed herein, such as those described with reference to the other FIGS. Of course, however, such representation 400 and others presented herein may be used in various applications and/or in permutations which may or may not be specifically described in the illustrative embodiments listed herein. Further, the representation 400 presented herein may be used in any desired environment.

Representation 400 includes a first directory 402. In some approaches, the first directory 402 is a main cache directory. The main cache directory may be extended such that an entire line or a partial-zero line is encoded with few bits, e.g., which may be stored with the tag data and/or metadata, to the effect of saving latency and bandwidth when the line is read or written. For example, it may be noted that, for purposes of an example, the first directory 402 includes 8192 congruence classes that may each include addresses, e.g., see TAG, that are each associated with a different cache line of the cache. Each congruence class may additionally and/or alternatively include metadata associated with an associated cache line of the cache. Each of these bits may be encoded to be set in in place of writing a predetermined pattern to an associated cache line, e.g., as part of a reclamation write operation of zeros. Advantageously, no separate cache data array storing the line contents is necessary.

In contrast, other techniques may be implemented to enable a computer system cache representing a zero filled only cache line (zero-lines) with a single bit. For example, an auxiliary zero-line cache-directory 404, e.g., "ZDIR," may be implemented parallel to, e.g., in a different directory than, the existing cache directory that stores zero-line addresses of cache lines. Note that the arrows in FIG. 4 are used to map relationships between entries of the first directory 402 and z-bits, e.g., see Z, of the zero-line cache-directory 404, e.g., "ZDIR."

With general reference now to FIG. 4, within one or more of these directories, each ZDIR entry may include a set of line addresses, e.g., called tags. A tag is used for checking if line(s) with certain address are present in the cache. Each tag may be associated with 1 or several zero-lines, typically with adjacent addresses, e.g., for example a page tag serving sixteen 256-byte lines in a 4 KB page. A single-bit associated with each tag may advantageously be used to represent whether the respective zero line or the set of zero-lines are present in the ZDIR.

In some approaches in which a zero-line is present in the ZDIR and requested by any unit in the system, a cache subsystem configured to perform one or more operations described herein may compose the actual zero filled line and deliver it to the requesting unit. When a ZDIR bit is set, and when the respective line is read by a core, the load-store unit may create the zero-line in place to the effect of eliminating any cache data-array access and thereby substantially reduce a read latency and bandwidth consumption that would otherwise be present in use of the zero-lines.

When a cache line is to be written with only zeros, the condition is recognized, e.g., by the cache subsystem, and instead of storing an entire line of zeros and address to the main cache, only an address and a single bit is preferably stored in the ZDIR. This is to the effect of substantially increasing a capacity of the cache subsystem, because the main cache contents are not replaced. This is furthermore to the effect of substantially increasing a data-array bandwidth of the cache, because instead of a whole line of 256 bytes, a single bit is transferred between a writer unit and the cache.

In some approaches, where a computer system instruction would otherwise be issued for writing an entire line of zeros to a particular line address, the condition is recognized, and a respective bit is instead set in the ZDIR. Specialized instructions to zero out cache lines communicate directly with ZDIR to set an associated respective bit. Furthermore, specialized instructions to zero out an entire page or larger amounts of data may be communicated directly with the ZDIR to set the respective bits, which thereby substantially speeds up a page zeroing operation.

In one embodiment, zero-lines are transferred as a single-bit across the processor fabric, between the cores, I/O units, and memory. The single bit may be encoded in a fabric control message and delivered to a destination of the single bit in one message as opposed to the techniques of conventional approaches which typically require eight to ten or even more messages to store messages associated with bytes of cache lines being written with a plurality of zeros. Accordingly, a substantial reduction to fabric latency and bandwidth consumption is enabled using the operations of embodiments and approaches described herein.

In another approach, relatively frequently used data patterns, e.g., for example all blanks or some other frequent pattern instead of zeros, may be encoded in the ZDIR in the same manner as zero-lines. In another approach, a main cache directory is extended such that an entire line or a partial-zero line is encoded with a plurality of bits to the effect of saving latency and bandwidth when the line is read or written.

Figure 5:
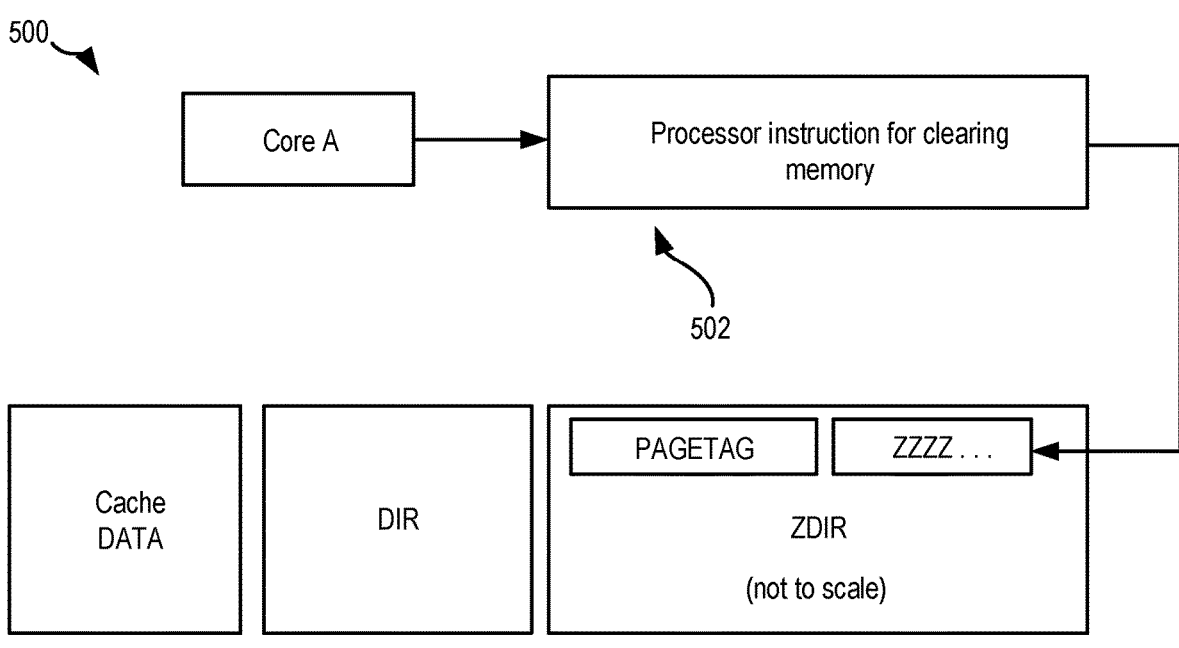
FIG. 5 is a representation of memory clearing being performed in a cache environment, in accordance with one embodiment of the present invention.

FIG. 5 depicts a representation 500 of memory clearing being performed in a cache environment, in accordance with one embodiment. As an option, the present representation 500 may be implemented in conjunction with features from any other embodiment listed herein, such as those described with reference to the other FIGS. Of course, however, such representation 500 and others presented herein may be used in various applications and/or in permutations which may or may not be specifically described in the illustrative embodiments listed herein. Further, the representation 500 presented herein may be used in any desired environment.

Representation 500 includes a specialized directory, e.g., see ZDIR, that in some approaches contains only the information on zero filled lines cache lines. For example, the ZDIR may include bits, e.g., ZZZ . . . , that may each be associated with different cache lines and are each configured to be set instead of writing a predetermined pattern in bytes of an associated cache line. The ZDIR may additionally and/or alternatively include address information, e.g., a tag, of the associated cache lines, e.g., see PAGETAG. In some approaches, there may be one tag per four KB page, sixteen z-bits per tag, where each bit represents a cache line. The representation also includes a cache directory, e.g., DIR, and a cache having data stored on bytes of the cache, e.g., see Cache DATA. The representation also includes a core, e.g., see Core A.

In some approaches, processor instructions for clearing memory may be issued by the core, e.g., see operation 502. The instruction may, in one approach, set one page worth of z-bits. The ZDIR may amortize a single TAG over 16 lines in a page, e.g., 16*256=4 KB.

With regards to a rate in which the cache may be cleared, clearing a 256-byte line may advantageously be accomplished by setting a single bit in ZDIR, in some approaches. It should be noted that a conventional cache's write rate may be about 160 gigabytes (GB) per second. Using techniques described herein, assuming that one page per cycle is cleared this is equivalent to setting 16 z-bits per cycle. Inventors have performed calculations to measure the relative cache clearing capabilities that are enabled by the techniques described herein. These calculations assume that a cycle time is 5 GHZ, then an effective clearing rate may be measure by 256 bytes*16 z-bits*5 GHz which is equal to 20 TB per second. This is relatively far superior to the 160 GB/s of the conventional cache and proves the utility and novelty of the techniques described in various embodiments and approaches described herein. When larger blocks are being cleared, the clearing rate can be even faster based on the fact that a typical processor instruction can transmit more than 16 bits per cycle.

Figure 6:
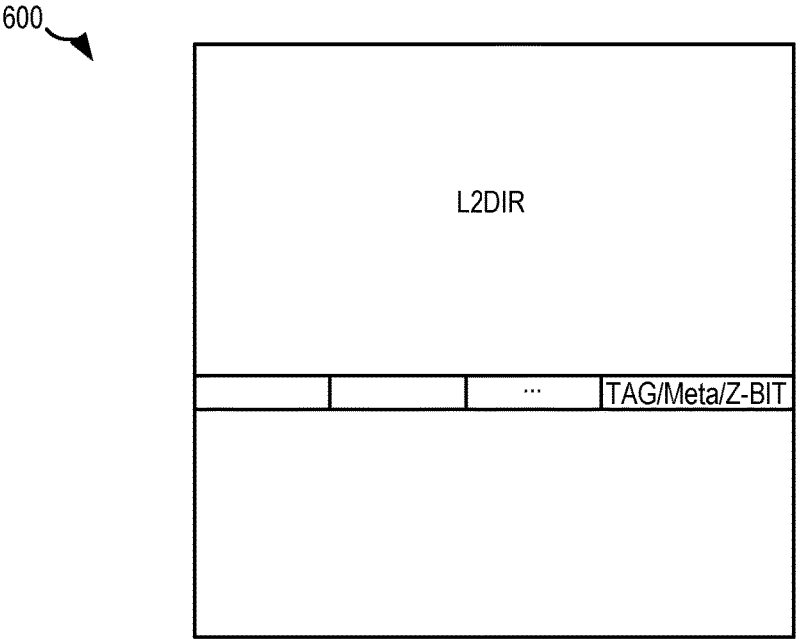
FIG. 6 is a representation of a main cache directory, in accordance with one embodiment of the present invention.

FIG. 6 depicts a representation 600 of a main cache directory, in accordance with one embodiment. As an option, the present representation 600 may be implemented in conjunction with features from any other embodiment listed herein, such as those described with reference to the other FIGS. Of course, however, such representation 600 and others presented herein may be used in various applications and/or in permutations which may or may not be specifically described in the illustrative embodiments listed herein. Further, the representation 600 presented herein may be used in any desired environment.

Representation 600 includes a main cache directory, e.g., see L2DIR. Representation illustrates the integration of zero-lines and partial zero-line statuses into the main cache directory instead of a separate ZDIR. For example, a bit, e.g., see Z-BIT, is shown integrated proximate to tag information, e.g., see TAG, and metadata, e.g., see META, in a line of the main cache directory. This bit relatively reduces several data array accesses when the line is entirely zero or partially zero. This scheme does not have the capacity advantage that is described in other embodiments and approaches described herein, but has a fast clear, access latency and bandwidth advantage because a single bit is able to be read and/or written instead of a full cache line.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
determining that a first predetermined pattern is to be written to a first cache line of a cache;
in response to the determination that the first predetermined pattern is to be written to the first cache line of the cache, setting a first bit in a first directory instead of writing the first predetermined pattern in the first cache line, the first bit being associated with the first cache line in the first directory; and
in response to receiving a first request to write to the cache, using the first bit to determine whether to perform a write operation.

2. The computer-implemented method of claim 1, comprising:

wherein the using the first bit to determine whether to perform the write operation comprises:
in response to receiving the first request to write to the cache, determining whether the first bit is set;
in response to a determination that the first bit is set, performing a write operation associated with the first request to the first cache line; and
unsetting the first bit in response to the write operation being performed.

3. The computer-implemented method of claim 2, wherein bytes of the first cache line are not read, subsequent to receiving the first request, to determine whether the first cache line is available for writing to.

4. The computer-implemented method of claim 2, comprising: in response to a determination that the first bit is not set, not performing the write operation associated with the first request to the first cache line.

5. The computer-implemented method of claim 2, comprising:
determining that a second predetermined pattern is to be written to the first cache line;
in response to the determination that the second predetermined pattern is to be written to the first cache line, setting a second bit in the first directory instead of writing the second predetermined pattern in the first cache line, the second bit being associated with the first cache line in the first directory;
in response to receiving the first request to write to the cache, determining whether the second bit is set; and
in response to a determination that the second bit is set, performing the write operation associated with the first request to the first cache line.

6. The computer-implemented method of claim 5, wherein the first predetermined pattern includes all bytes of the first cache line having only zeros.

7. The computer-implemented method of claim 6, wherein the second predetermined pattern is selected from the group consisting of: a portion of the bytes of the first cache line having only zeros, all of the bytes of the first cache line having only blanks, and a portion of the bytes of the first cache line having only blanks.

8. The computer-implemented method of claim 2, comprising:
determining that a second predetermined pattern is to be written to a second cache line;
in response to the determination that the second predetermined pattern is to be written to the second cache line, setting a second bit in the first directory instead of writing the second predetermined pattern in the second cache line, the second bit being associated with the second cache line in the first directory;
in response to receiving a second request to write to the cache, determining whether the second bit is set;
in response to a determination that the second bit is set, performing a write operation associated with the second request to the second cache line;
unsetting the second bit in response to the write operation associated with the second request being performed; and
in response to a determination that the second bit is not set, not performing the write operation associated with the second request to the second cache line.

9. The computer-implemented method of claim 1, wherein the first directory is a directory of the cache, wherein the directory of the cache includes addresses each associated with a different cache line of the cache, wherein the first bit is stored with an address of the first cache line.

10. The computer-implemented method of claim 1, wherein the first directory is different than a second directory that is a directory of the cache, wherein the second directory includes addresses each associated with a different cache line of the cache.

11. The computer-implemented method of claim 1, comprising: storing an address of the first cache line with the first bit in the first directory.

12. A computer program product, the computer program product comprising a computer readable storage medium having program instructions embodied therewith, the program instructions readable and/or executable by a computer to cause the computer to:

determine, by the computer, that a first predetermined pattern is to be written to a first cache line of a cache;

in response to the determination that the first predetermined pattern is to be written to the first cache line of the cache, set, by the computer, a first bit in a first directory instead of writing the first predetermined pattern in the first cache line, the first bit being associated with the first cache line in the first directory; and in response to receiving a first request to write to the cache, use the first bit to determine whether to perform a write operation.

13. The computer program product of claim 12, wherein the using the first bit to determine whether to perform the write operation comprises:

in response to receiving the first request to write to the cache, determine, by the computer, whether the first bit is set;

in response to a determination that the first bit is set, perform, by the computer, a write operation associated with the first request to the first cache line; and unset, by the computer, the first bit in response to the write operation being performed.

14. The computer program product of claim 13, wherein bytes of the first cache line are not read, subsequent to receiving the first request, to determine whether the first cache line is available for writing to.

15. The computer program product of claim 13, the program instructions readable and/or executable by the computer to cause the computer to: in response to a determination that the first bit is not set, not perform, by the computer, the write operation associated with the first request to the first cache line.

16. The computer program product of claim 13, the program instructions readable and/or executable by the computer to cause the computer to:

determine, by the computer, that a second predetermined pattern is to be written to the first cache line;

in response to the determination that the second predetermined pattern is to be written to the first cache line, set, by the computer, a second bit in the first directory instead of writing the second predetermined pattern in the first cache line, the second bit being associated with the first cache line in the first directory;

in response to receiving the first request to write to the cache, determine, by the computer, whether the second bit is set; and in response to a determination that the second bit is set, perform, by the computer, the write operation associated with the first request to the first cache line.

17. The computer program product of claim 13, the program instructions readable and/or executable by the computer to cause the computer to:

determine, by the computer, that a second predetermined pattern is to be written to a second cache line;

in response to the determination that the second predetermined pattern is to be written to the second cache line, set, by the computer, a second bit in the first directory instead of writing the second predetermined pattern in the second cache line, the second bit being associated with the second cache line in the first directory;

in response to receiving a second request to write to the cache, determine, by the computer, whether the second bit is set;

in response to a determination that the second bit is set, perform, by the computer, a write operation associated with the second request to the second cache line;

unset, by the computer, the second bit in response to the write operation associated with the second request being performed; and in response to a determination that the second bit is not set, not perform, by the computer, the write operation associated with the second request to the second cache line.

18. The computer program product of claim 12, wherein the first directory is a directory of the cache, wherein the directory of the cache includes addresses each associated with a different cache line of the cache, wherein the first bit is stored with an address of the first cache line.

19. The computer program product of claim 12, wherein the first directory is different than a second directory that is a directory of the cache, wherein the second directory includes addresses each associated with a different cache line of the cache.

20. A system, comprising:

a processor; and logic integrated with the processor, executable by the processor, or integrated with and executable by the processor, the logic being configured to:

determine that a first predetermined pattern is to be written to a first cache line of a cache;

in response to the determination that the first predetermined pattern is to be written to the first cache line of the cache, set a first bit in a first directory instead of writing the first predetermined pattern in the first cache line, the first bit being associated with the first cache line in the first directory; and in response to receiving a first request to write to the cache, use the first bit to determine whether to perform a write operation.

\* \* \* \* \*